US011325629B2

(12) United States Patent
Webert et al.

(10) Patent No.: US 11,325,629 B2
(45) Date of Patent: May 10, 2022

(54) TRANSPORT TROLLEY

(71) Applicant: Wanzl GmbH & Co. KGaA, Leipheim (DE)

(72) Inventors: Dirk Webert, Leipheim (DE); Johann Daminger, Neu-Ulm (DE); Hermann Eichele, Leipheim (DE); Markus Riesenegger, Ettenbeuren (DE); Ralf Maier, Leipheim (DE); Michael Gerstmaier, Obermedlingen (DE); Paul Ruf, Eppishausen (DE); Karl-Heinz Horn, Krumbach/Niederraunau (DE); Georg Wiedemann, Kirchheim (DE); Thomas Gasche, Leipheim (DE)

(73) Assignee: Wanzl GmbH & Co. KGaA, Leipheim (DE)

(*) Notice: Subject to any disclaimer, the term of this patent is extended or adjusted under 35 U.S.C. 154(b) by 0 days.

(21) Appl. No.: 17/079,332

(22) Filed: Oct. 23, 2020

(65) Prior Publication Data
US 2021/0107550 A1 Apr. 15, 2021

Related U.S. Application Data

(62) Division of application No. 15/772,788, filed as application No. PCT/EP2016/075426 on Oct. 21, 2016, now Pat. No. 11,059,507.

(30) Foreign Application Priority Data

Nov. 2, 2015 (DE) ...................... 20 2015 009 019.2
Nov. 2, 2015 (DE) ...................... 20 2015 105 816.0

(51) Int. Cl.
*B62D 39/00* (2006.01)
*B62B 5/06* (2006.01)
(Continued)

(52) U.S. Cl.
CPC ................ *B62B 5/06* (2013.01); *B62B 3/005* (2013.01); *B62B 5/0096* (2013.01); *B62B 5/082* (2013.01)

(58) Field of Classification Search
CPC ......... B62B 5/06; B62B 5/0096; B62B 5/082; B62B 5/08; B62B 3/1496; B62B 3/1492;
(Continued)

(56) References Cited

U.S. PATENT DOCUMENTS 3,147,021 A 9/1964 Lachance
4,632,411 A 12/1986 Badger
(Continued)

FOREIGN PATENT DOCUMENTS

AU 2015200297 A1 8/2015
CN 202669890 U 1/2013
(Continued)

OTHER PUBLICATIONS

ISA European Patent Office, International Search Report Issued in Application No. PCT/EP2016/075426, dated Jul. 27, 2017, WIPO, 10 pages.

*Primary Examiner* — James M Dolak
(74) *Attorney, Agent, or Firm* — McCoy Russell LLP

(57) ABSTRACT

The invention relates to a stackable transport trolley, in particular a stackable shopping trolley, comprising a chassis and a basket; the chassis includes a support frame and a frame of rods which is arranged on the support frame, the frame of rods supporting the basket.

13 Claims, 14 Drawing Sheets

(51) Int. Cl.
*B62B 3/00* (2006.01)
*B62B 5/00* (2006.01)
*B62B 5/08* (2006.01)

(58) Field of Classification Search
CPC ......... B62B 3/005; B62B 3/144; B62B 3/142; B62B 3/14; B62B 3/1408; B62B 2501/065; B62B 2501/067; B62B 2501/00
See application file for complete search history.

(56) References Cited

U.S. PATENT DOCUMENTS

| | | | |
|---|---|---|---|
| 4,650,199 A | 3/1987 | Rehrig | |
| 5,289,936 A | 3/1994 | Jones et al. | |
| 5,613,696 A | 3/1997 | de Luna | |
| 5,794,952 A | 8/1998 | Kern et al. | |
| 6,676,139 B1 | 1/2004 | Saccani | |
| 6,705,623 B2* | 3/2004 | Nadeau | B60B 1/006 |
| | | | 280/33.991 |
| 6,983,944 B2* | 1/2006 | Bergia | B62B 3/1496 |
| | | | 280/33.991 |
| 7,104,552 B2 | 9/2006 | Swanson et al. | |
| 7,350,269 B2 | 4/2008 | Dominic et al. | |
| 7,384,049 B2* | 6/2008 | Peota | B62B 3/144 |
| | | | 280/33.992 |
| 7,407,169 B2* | 8/2008 | Splain | B62B 3/144 |
| | | | 280/33.991 |
| 7,416,194 B2 | 8/2008 | Splain et al. | |
| 7,562,729 B2 | 7/2009 | Hämmerle | |
| 7,766,347 B2* | 8/2010 | Ryan | B62B 3/144 |
| | | | 280/33.993 |
| 8,096,564 B2 | 1/2012 | Berthiaume et al. | |
| 8,684,371 B2* | 4/2014 | Berthiaume | B62B 3/1468 |
| | | | 280/33.991 |
| 9,682,719 B2* | 6/2017 | Stauff | B29C 69/00 |
| 9,731,742 B2* | 8/2017 | Stauff | B62B 3/1476 |
| 11,059,507 B2* | 7/2021 | Webert | B62B 3/1496 |
| 11,161,537 B2* | 11/2021 | Giampavolo | B62B 3/144 |
| 11,167,781 B2* | 11/2021 | Eberlein | B62B 3/1444 |
| 11,214,291 B2* | 1/2022 | Bowman | B62B 5/082 |
| 2002/0135144 A1* | 9/2002 | Murar | B62B 3/1404 |
| | | | 280/33.991 |
| 2004/0090025 A1* | 5/2004 | Frommherz | B62B 3/144 |
| | | | 280/33.993 |
| 2007/0063464 A1 | 3/2007 | Splain et al. | |
| 2010/0327545 A1 | 12/2010 | Splain et al. | |
| 2014/0137368 A1 | 5/2014 | Frame | |

FOREIGN PATENT DOCUMENTS

| | | |
|---|---|---|
| DE | 2727310 A1 | 1/1979 |
| DE | 19626995 A1 | 1/1998 |
| DE | 102014101504 A1 | 8/2015 |
| EP | 0672568 A1 | 9/1995 |
| EP | 0760295 A1 | 3/1997 |
| EP | 0895921 A1 | 2/1999 |
| ES | 1114605 U | 6/2014 |
| WO | 03047940 A1 | 6/2003 |

\* cited by examiner

Detail H
Maßstab: 1:1
3.5 - 12 mm
6 - 14 mm

Detail G
Maßstab: 1:1
3.5 - 8 mm
6 - 14 mm

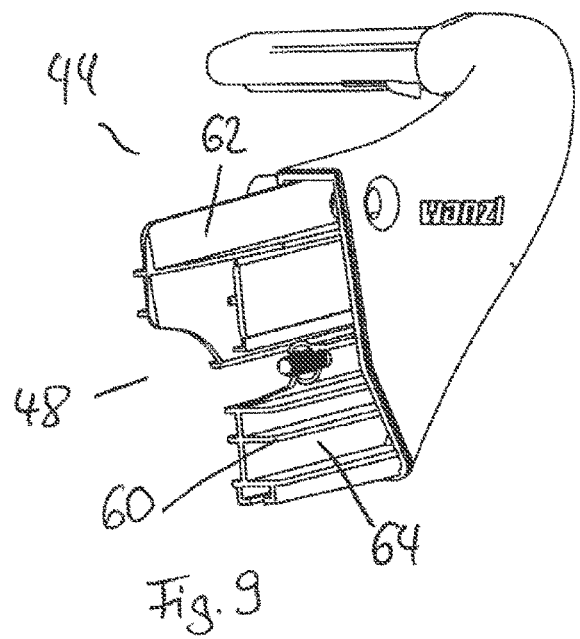
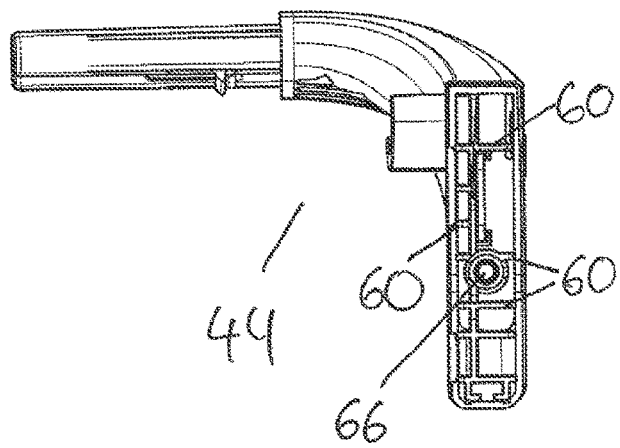
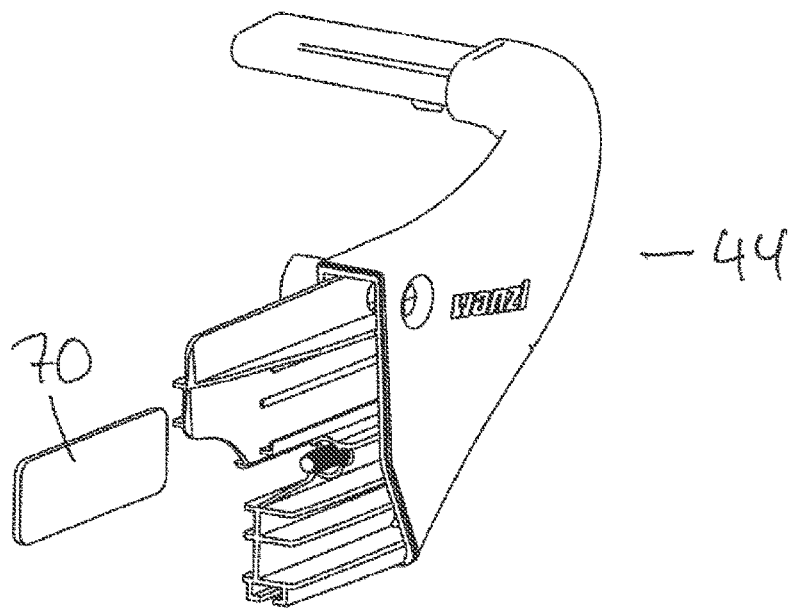

TRANSPORT TROLLEY

CROSS-REFERENCE TO RELATED APPLICATIONS

The present application is a divisional of U.S. patent application Ser. No. 15/772,788 entitled "TRANSPORT TROLLEY," filed on May 1, 2018. U.S. patent application Ser. No. 15/772,788 is a U.S. National Phase of International Patent Application Serial No. PCT/EP2016/075426 entitled "TRANSPORT TROLLEY," filed on Oct. 21, 2016. International Patent Application Serial No. PCT/EP2016/075426 claims priority to German Utility Model Application No. 20 2015 105 816.0, filed on Nov. 2, 2015 and German Utility Model Application No. 20 2015 009 019.2 filed on Nov. 2, 2015. The entire contents of each of the above-cited applications are hereby incorporated by reference in their entirety for all purposes.

TECHNICAL FIELD

The present disclosure relates to a stackable transport trolley, and to a child seat for a stackable transport trolley.

BACKGROUND AND SUMMARY

Stackable transport trollies, in particular shopping trollies, are already known from the prior art. Transport trollies of this type in particular have a chassis with castors and with bars. A basket which is generally produced from wire or plastic is arranged on the bars. Furthermore, the chassis is equipped with a pushing handle, on which a coin deposit lock can be provided. Transport trollies of this type generally also have a loading platform on which, for example, drinks crates can be deposited.

A transport trolley of this type is known, for example, from DE 10 2014 101 504 A1. Further transport trollies are known, for example, from US 2010/0327545 A1, CN 202669890 U and ES 1 114 605.

The connection of the castors to the chassis in transport trollies of this type is dealt with, for example, by EP 0 760 295 B1, U.S. Pat. No. 7,350,269 B2 and US 2014/0137368 A1, to mention just a few examples.

EP 1 451 053 B1 discloses a child seat for a shopping trolley, which is formed from plastic and consists of a seat and two components which are connected to each other in a fixed position and form a backrest.

It is the object of the present invention to develop a stackable transport trolley of the type mentioned at the beginning and a child seat for a transport trolley of the type mentioned at the beginning in an advantageous manner, in particular to the effect that said transport trolley can be constructed in a simple manner and at the same time is provided in a stable and durable manner, in particular when the basket of the transport trolley and the child seat are formed from plastic.

This object is achieved according to the invention by a stackable transport trolley with embodiments of this disclosure.

According thereto, it is provided that a stackable transport trolley comprising a chassis and comprising a basket is provided, wherein the chassis has a supporting frame and a wire framework arranged on the supporting frame, wherein the wire framework supports the basket. The basket is a plastic basket. The wire framework has a wire frame with two rising basket fastening brackets and the basket is pushed onto the basket fastening brackets. Based on the assembled state of the transport trolley, the wire frame has, on the rear side, a cross strut which connects the two basket fastening brackets.

The stackable transport trolley can be in particular a stackable shopping trolley.

The invention is based on the basic concept of providing a supporting frame which is configured comparatively simply and can be manufactured in a simple manner and so as then to provide a possibility on the supporting frame, by means of a wire framework which can be produced by wires to be bent in a simple manner, by means of which the basket can be supported on the supporting frame. This makes it possible to construct a stackable transport trolley in a simple manner and to thereby significantly reduce the manufacturing costs for the stackable transport trolley. The wire framework can be formed, for example, by bending wires. The wires to be used can be, for example, galvanized steel wires which can have a thickness of between 8-20 mm. It is conceivable, for example, to select a wire thickness of between 10-15 mm, preferably of between 12-14 mm, in particular approx. 13 mm.

In particular, it is conceivable for the supporting frame to be of U-shaped design. By means of the U-shaped design of the supporting frame, it is possible, for example, to produce the supporting frame by cutting semi-finished products, such as, for example, tubes, to length and then to bend the supporting frame in a U-shaped manner. This permits a simple provision of the supporting frame and cost-effective manufacturing is possible by the use of, for example, semi-finished products.

Furthermore, it can be provided that, in the assembled state of the transport trolley, the free ends of the supporting frame are arranged on the rear side of the transport trolley. A configuration of this type permits easy stackability since, by this means, in conjunction with the stacking of the transport trollies, a further transport trolley can simply be pushed into a transport trolley which has already been parked. The opening of the U-shaped supporting frame therefore also serves for receiving the transport trolley which is to be pushed in.

Furthermore, it can be provided that a supporting frame is located only in a plane. This means in particular that the bending of the supporting frame takes place only in a single plane, as a result of which a complex shaping of the supporting frame is avoided. For example, a complicated refinishing and/or heat treatment of the supporting frame is avoided; rather, it suffices to correspondingly process, in particular to bend, the basic material of the supporting frame in order to produce the shape of the supporting frame.

Furthermore, it can be provided that the wire framework has two wire brackets which sit on the supporting frame. This permits a simple construction of the chassis, namely firstly a basic plane which is provided by the supporting frame and, building on the latter, a wire framework by means of the two wire brackets which thereby permit the corresponding construction which has the task of supporting the basket.

The two wire brackets can be of substantially U-shaped design. In this connection, it is also conceivable for the two wire brackets to essentially have only one bend in a single plane or for only a small part to extend out of the bending plane of the wire bracket. This permits a simple shaping of the wire brackets, which simplifies the production of the wire framework.

The two wire brackets can be of identical design. This likewise simplifies the production since a distinction does not need to be made between, for example, left or right wire brackets.

In addition, it can be provided that the wire brackets have at least three rectilinear portions. The effect achieved by this is that a stable structure can be brought about for the wire framework. It is conceivable for the three rectilinear portions of the wire bracket together with the supporting frame of the underframework to define a substantially square or trapezoidal shape.

In addition, it can be provided that, in the assembled state, the basket is at least partially placed on the central portion of the wire bracket. As a result, it is possible to support the basket not only at points but also over a greater distance, which improves the stability of the entire transport trolley as a whole.

Furthermore, it is provided that a horizontal cross bracing is arranged in the front-side region of the central portion of the wire bracket. By this means, the basket, in particular the bottom region of the basket, is likewise supported and also reinforced. This makes it possible to reinforce the basket in such a manner that the weight of the products placed into the transport basket can be reliably absorbed.

Furthermore, it can be provided that the wire brackets are arranged symmetrically with respect to the longitudinal axis of the transport trolley. The symmetrical arrangement results in a uniform introduction of force from the basket via the wire framework into the supporting frame and from there into the castors of the transport trolley. In addition, it is conceivable for the wire brackets to be arranged at the free ends of the supporting frame. This facilitates the stackability and at the same time also a self-contained structure which permits a uniform distribution of force and load over the entire transport trolley during use.

In addition, it is possible for a tube section to be fitted on the supporting frame at each of its free ends.

A first free end of a wire bracket can be at least partially inserted into said tube section. This facilitates the positioning of the wire bracket relative to the supporting frame during the installation. In addition, by a free end of the wire bracket being mounted in the tube section, the stability of the structure is improved.

A second free end of a wire bracket can rest on the supporting frame. Said free end can be, for example, welded on the supporting frame there.

An element of a connection of a castor of the transport trolley can be partially inserted into the tube section. By this means, a plurality of functions can be taken on by the tube section and, as a result, a reduction in weight is made possible by integrating the functions into one structural element of the transport trolley.

In a further possible refinement of the invention, it can be provided that the wire framework furthermore has a wire frame with two rising basket fastening brackets. This permits a simple and secure fastening of the basket on the wire framework. Said bracket-like structure is readily suitable for absorbing the load forces transmitted by the basket.

The height of the basket fastening brackets can be selected depending on the basket size. However, it is also conceivable that the size of the basket fastening brackets is always structurally identical, and only the size of the basket and the corresponding counterpart of the basket which is placed onto the basket fastening brackets are correspondingly adapted.

The two basket fastening brackets can be of V-shaped design. The V structure permits a secure connection of the basket to the wire framework and at the same time a uniform introduction of force from the basket into the wire framework. It is conceivable in particular for the limbs of the V shape to be positioned narrowly. This achieves a certain rigidity and increased stability. Greater forces can thus also be transmitted.

In particular, it can be provided that, in the mounted state of the basket on the basket fastening brackets, the tips of the basket fastening brackets end below the handle. By this means, the structure is simplified overall and costs are thereby reduced. However, this is not absolutely required. If, for example, there is a desire to reduce the overall height of the basket while keeping the dimensions of the basket fastening brackets the same, the tips of the basket fastening brackets could also project into the region of the handle.

It is conceivable in particular for the wire frame to be formed integrally. It therefore becomes possible to form the wire frame by bending of a single wire. Based on the assembled state of the transport trolley, the wire frame can in each case have, on the front side, a free end which in each case rests on one of the wire brackets. After appropriate positioning during the installation, said free end can therefore be fastened on the wire bracket, for example merely by means of a welding point. The basket can be pushed onto the basket fastening bracket. This facilitates the installation and fastening of the basket on the wire frame. By means of the integral form of the wire frame, it furthermore becomes possible to dispense with transverse struts. In particular, the rear-side transverse struts which have customarily been present to date can be omitted.

The basket can have basket fastening bracket receptacles which, for example, are of tubular design.

The basket fastening bracket receptacles can be designed as openings in the basket, into which the basket fastening brackets can be pushed or by means of which the basket can be pushed onto the basket fastening brackets.

However, said openings do not have to engage completely around the basket fastening brackets; it can also suffice for the receptacle not to engage therearound completely, but rather only to be designed as a wall which partially engages around the basket fastening brackets.

In principle, it is therefore conceivable for the basket fastening bracket receptacle to be designed only as a guide, but it is also conceivable for the basket fastening bracket receptacle to be designed as a tubular receptacle in the basket, into which the basket fastening bracket can be at least partially or substantially completely mounted.

In addition, it is possible for the basket to be secured against being pulled off on the basket fastening bracket by means of at least one locking clip. For example, a two-part locking clip which is clipped into a corresponding opening in the basket after the basket has been placed onto the basket fastening brackets is conceivable. In this connection, it is conceivable in particular for the V-shaped basket fastening brackets to be arranged in an upside down V-shaped manner on the wire bracket such that the tip of the V points upward in the assembled state. The locking clip can then be inserted in the region of the tip and therefore reliably prevents the basket from being pulled off from the basket fastening bracket. Cost-effective and simple installation thereby becomes possible.

In principle, however, a screw or a screw and nut combination could also be used instead of a locking clip.

Furthermore, it can be provided that the basket is clipped on the wire framework. For this purpose, for example, locking catches can be provided in the bottom region of the basket, by means of which the basket is fixed on the wire framework. The locking catches can be arranged here offset with respect to one another such that, in the assembled state, they engage around the wires of the wire framework.

In particular, it can be provided that the basket has latching catches, by means of which, in the assembled state, the basket is clipped on the wire framework. Simple, reliable and stable clipping of the basket on the wire frame can be made possible by means of the latching catches.

Furthermore, it can be provided that the basket at least partially has a nest structure. The effect which can be achieved in particular by a nest-like structuring of the walls of the basket is that, in addition to a sufficient and previously good stability, the use of materials can be reduced. In addition, the effect which can be achieved by the nest-like structure is that soiling of the walls of the basket is avoided.

The nest structure can be formed by a plurality of nest struts. Said nest struts can be arranged in particular in a plurality of directions and obliquely with respect to one another. In particular, it is also not required for a regular structuring of the webs or of the nest struts to be necessary. However, it is conceivable, for example, for the opposite side walls in the structure to be similar or of symmetrical design.

The nest struts for a side wall of the basket can have a larger cross section in the region facing the ground than in the region which faces the basket opening. This has the advantage that, in the assembled state, the stability in the region facing the ground is thereby increased. The cross section can be round, oval or of another corresponding suitable shape, or free shape. In principle, it is also conceivable for a variation of the cross section over the entire height of the nest strut to be possible and also to be correspondingly varied here.

In particular, it can be provided that the basket is a plastic basket. By this means, the material costs are reduced and the production costs as a whole reduced.

In the assembled state, the basket can be connected to a pushing handle, wherein the pushing handle has two push-in blades, and wherein the basket has two beveled push-in openings, into which the push-in blades are inserted in a latching manner in the assembled state. The effect which can be achieved by the beveling of the push-in openings is that the introduction of force via the pushing handle into the basket and from the basket into the chassis is possible in a favorable manner. In addition, the beveling permits a direct introduction of force and also facilitates a latching of the slide pushing handle in the basket. In particular, the bending torque which possibly arises is also reduced since the pushing handle can have corresponding stop surfaces which are designed in the manner of counterparts and, at the beveled push-in openings, are each fitted to the edge of the beveled push-in openings.

In particular, it can be provided that the push-in opening has a double bevel.

A push-in blade can have at least one stiffening rib, in particular a plurality of stiffening ribs. This improves the rigidity of the push-in blade or the connection of the pushing handle to the basket.

The push-in blade is divided substantially centrally into an upper push-in blade half and a lower push-in blade half. As a result, a division of the force flux from the pushing handle into the basket can be better controlled.

The pushing handle and the push-in blades can be formed integrally.

In the assembled state, a bolt-like securing element (for example a screw bolt) can be inserted in the push-in blade halves in order to prevent the pushing handle from being pulled off from the basket in the assembled state. For example, it is conceivable for a screwing-in thread to be provided in the push-in opening in the basket, into which a screw bolt can be screwed through the push-in blade or through a corresponding recess in the pushing handle.

In the assembled state, an identification chip, in particular an RFID chip, can be arranged between the push-in blade and a wall of the push-in blade opening. This makes it possible to identify the shopping trolley. It is conceivable for a supermarket to which the transport trolley belongs to be able to be stored in the identification chip and for the latter to then be correspondingly read. An identification chip of this type can be used for theft prevention.

In addition, it can be provided that, in the assembled state, the basket has, on the front side, a nest-like front wall which is overlapped by an overlapping wall which overlaps the front wall and projects into the basket interior.

The overlapping wall can be at least partially of bead-like design. By means of such a bead-like surrounding wall, a protection function of the inserted products against dropping out is formed.

Furthermore, the bead-like surrounding wall permits an improved impact behavior against another transport trolley during the stacking of a plurality of transport trollies in one another, and therefore a bead-like structure of the overlapping wall at the same time has a favorable damping effect.

By means of the overlapping wall which can also be designed, for example, in a bead-like or solid manner, a stop surface is defined which is of advantage in particular when stacking a plurality of transport trollies. The effect achieved by this is that the basket is reinforced in the region in which it is exposed to high loads, such as blows, impact forces or the like during the stacking operation. Furthermore, the effect which is achieved by the overlapping wall is that, during braking of the transport trolley, products cannot drop out of the basket as a result of inertia forces or inertia effects.

The overlapping wall can have an information field. An information field of this type can have, for example, advertising information, the logo of the commercial chain of an individual product, or else another advertisement.

Owing to the fact that the overlapping wall is, for example, designed in a bead-like manner and so as to project into the basket interior, a protective function against scratching of the information field is furthermore made possible.

This is attributed in particular to the fact that the information field is not the impact surface of the transport trolley when the latter is pushed into another transport trolley during the stacking. As a result, it is possible, for example, to place advertising information in the information field and not to visually devalue said information by, for example, scratching.

The information field can have a transparent cover which can be clipped in in the edge region of the information field. The effect achieved by this is that the inserted advertisement can firstly be exchanged, but secondly is also protected by transparent covering.

Furthermore, the present invention relates to a child seat for a stackable transport trolley. In particular, the stackable transport trolley is the aforementioned transport trolley. The child seat has a backrest which is composed of plastic, is to be arranged on the transport trolley so as to be pivotable about a horizontal axis and to which at least one seat is coupled in a sliding or pivotable manner, wherein the backrest is formed integrally, and wherein at least one subsection of the backrest is designed in the manner of a hollow body.

By means of the integral form of the backrest and the construction in the manner of a hollow body, it is possible to provide a lightweight and at the same time stable structure for the backrest. By this means, the construction of the child seat for a stackable transport trolley can be simplified overall. The child seat can have a sandwich structure at least partially, for example in the region of the side members.

The backrest can be of substantially H-shaped design. The H-shaped structure makes it possible in particular to form a sufficiently stable and load-bearing structure for a child seat with little use of materials.

Furthermore, it can be provided that the connection of the two limbs of the H shape is designed as a backrest wall. By this means, a connection of the two side members is produced in a simple and at the same time functional manner and at the same time a backrest wall is formed in a manner saving on material.

The backrest can have side members which are in the manner of hollow bodies and are provided with reinforcing struts in the interior. This provides a structure which is sufficiently stiff and at the same time saves on material.

Cavities can be provided between the reinforcing struts, which cavities, in the assembled state, are accessible in the region of the backrest wall via openings, in particular slots, provided on that side of the backrest which faces the basket interior. The effect achieved by this is that the backrest can be formed in a simple manner by injection molding and at the same time hollow bodies can also be provided in the side members in the manner of hollow bodies in the region of the backrest wall.

Cavities which, in the assembled state, are accessible in the region below the backrest wall via openings located on the side-member inner side can be provided between the reinforcing struts. It is thereby possible also to provide cavities here, and therefore material accumulations can also be avoided here.

BRIEF DESCRIPTION OF THE FIGURES

Further details and advantages of the invention will now be explained in more detail with reference to an exemplary embodiment which is illustrated in the drawings, in which:

FIG. 9 shows a perspective view of part of the pushing handle of the transport trolley according to FIG. 1;

FIG. 10 shows a further view of the pushing handle according to FIG. 9;

FIG. 11 shows a further perspective view of the pushing handle according to FIG. 9;

DETAILED DESCRIPTION OF FIGURES

Figure 1:
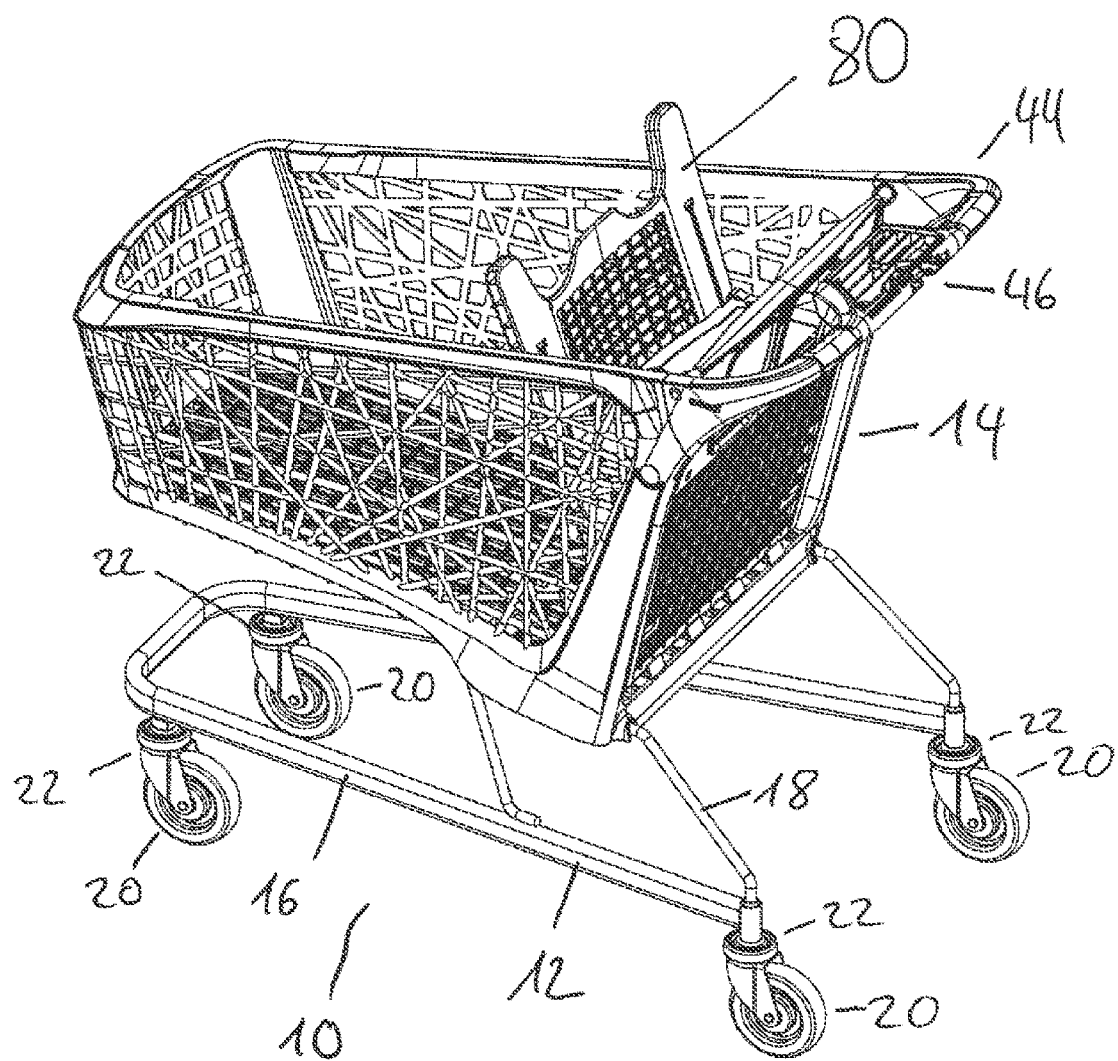
FIG. 1 shows a perspective view of an exemplary embodiment of a stackable transport trolley according to the invention, here a stackable shopping trolley.

FIG. 1 shows, in a perspective view, an exemplary embodiment of a stackable transport trolley 10 according to the invention, here a stackable shopping trolley 10.

The shopping trolley 10 has a chassis 12 and a basket 14.

The chassis 12 furthermore has a supporting frame 16 and a wire framework 18 arranged on the supporting frame 16, wherein the wire framework 18 supports the basket 14. Four wheels 20 are fastened to the supporting frame 16 via respective wheel suspensions 22.

The supporting frame 16 is bent here from a semi-finished product and is of U-shaped design.

In the assembled state of the shopping trolley 10, the free ends of the supporting frame 16 are arranged on the rear side of the shopping trolley 10.

The supporting frame 16 itself is of planar design, i.e. it is located in a plane. In other words, this therefore relates to the fact that the bending of the supporting frame 16 takes place only in one plane, and therefore the supporting frame is only bent two-dimensionally and not three-dimensionally.

Figure 2:
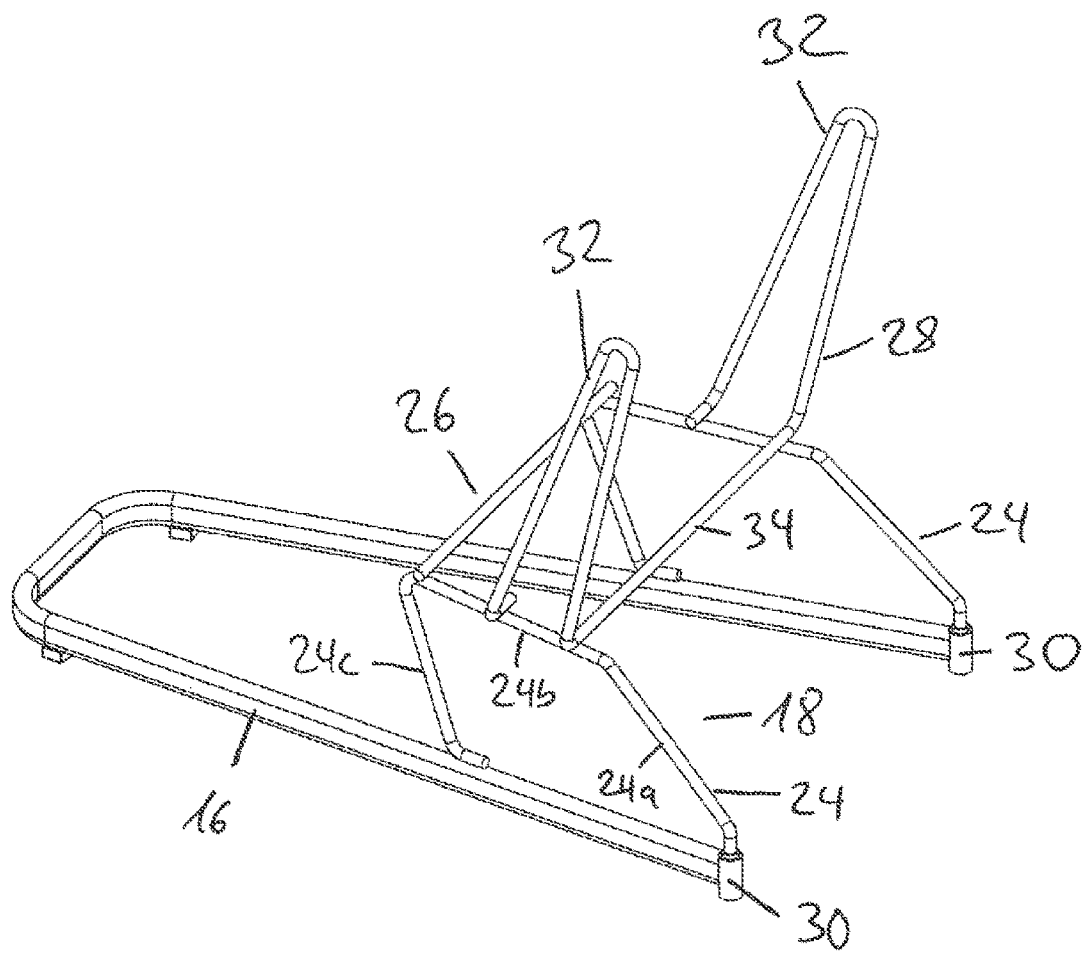
FIG. 2 shows a perspective view of the chassis of the transport trolley according to FIG. 1.

As furthermore arises from FIG. 2, which shows the supporting frame 16 and the wire framework 18 arranged thereon, the wire framework 18 consists of two wire brackets 24, a cross strut 26 (also cross bracing 26) and a wire frame 28.

The wire framework 18 has two wire brackets 24 which sit on the supporting frame 16.

The wire brackets 24 are of substantially U-shaped design.

The wire bracket 24 furthermore has three rectilinear portions 24a, 24b and 24c.

The two wire brackets 24 are of identical design here.

In the assembled state, as shown in FIG. 1, the basket 14 is at least partially placed on the central portion 24b of the wire bracket 24.

The horizontal cross bracing 26 is arranged in the front-side region of the central portion 24b of the wire bracket 24.

Furthermore, the wire brackets 24 are arranged at the free ends of the supporting frame 16 and, furthermore, are arranged symmetrically with respect to the longitudinal axis of the shopping trolley 10.

A tube section 30 is fitted on the supporting frame 16 at each of the free ends.

Figure 3:
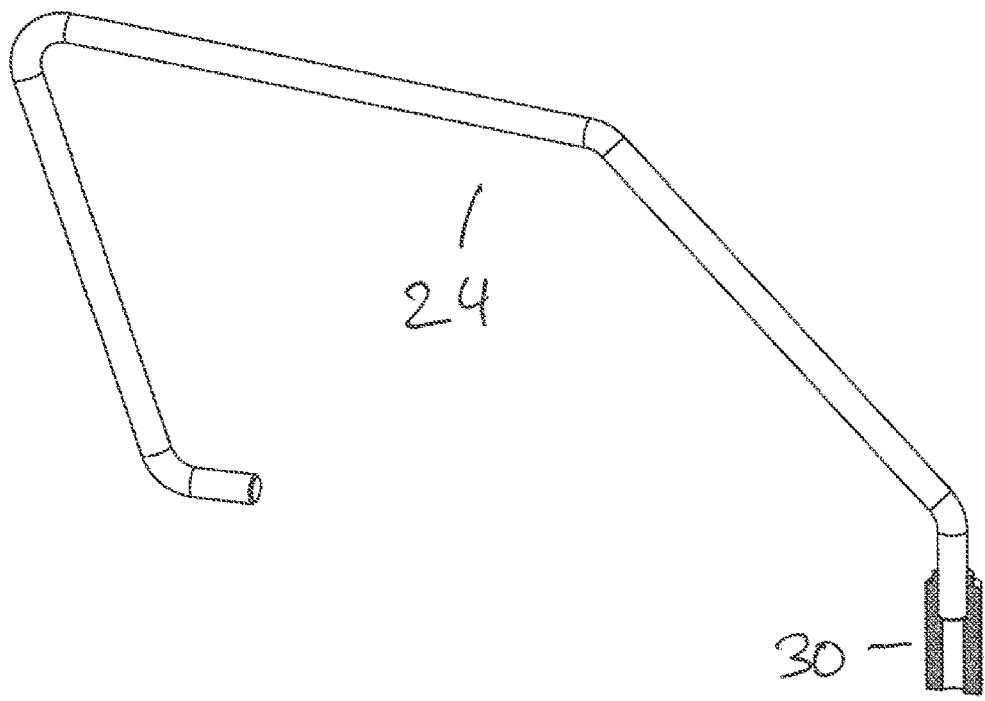
FIG. 3 shows a perspective view of part of the wire framework of the chassis of the transport trolley according to FIG. 1.

A first free end of the wire bracket 24 is in each case at least partially inserted into the tube section 30, specifically, according to FIG. 2, that free end of the wire bracket 24 which adjoins the first rectilinear portion 24a of the wire bracket 24 (cf. FIG. 3).

A second free end of the wire bracket 24 rests on the supporting frame 16, here that free end of the wire bracket 24 which adjoins the third portion 24c of the wire bracket 24.

Furthermore, an element of the suspension 22 of the wheel 20 of the shopping trolley 10 is inserted in the tube section 30.

The wire frame 28 furthermore has two rising basket fastening brackets 32.

The basket fastening brackets 32 are of substantially identical design, specifically are V-shaped.

Furthermore, the wire frame 28 is formed integrally.

Based on the assembled state of the shopping trolley 10, the wire frame 28 furthermore has, on the rear side, a cross strut 34 which connects the two basket fastening brackets 32 to each other.

In addition, based on the assembled state of the shopping trolley 10, the wire frame 28 in each case has, on the front side, a free end which in each case rests on one of the wire brackets 24. The two free ends point inward here, based on the assembled state of the wire framework 18.

The wire frame 28 has the advantage of only involving a single component which is at the same time stable. Said component is fastened in a fixed position on the wire bracket, for example by welding.

Load forces of the basket 14 can be absorbed by means of the wire frame 28 and at the same time a transverse connection can be provided by the cross strut 34.

A wire frame 28 of this type can be produced in a simple manner, with it being possible for all of the components of the wire framework to be produced from a wire having a thickness within the range of between 10-15 mm, for example approx. 13 mm.

The wire can be in particular solid material. However, it is also conceivable to use a corresponding tube.

The basket 14 is pushed onto the basket fastening bracket 32 and thereby supported. For this purpose, the basket 14 has two basket fastening bracket receptacles, into which the basket fastening brackets 32 are pushed. At the same time, the bottom of the basket 14 sits on the cross struts 26 and 34 (cf. FIG. 6).

Figure 6:
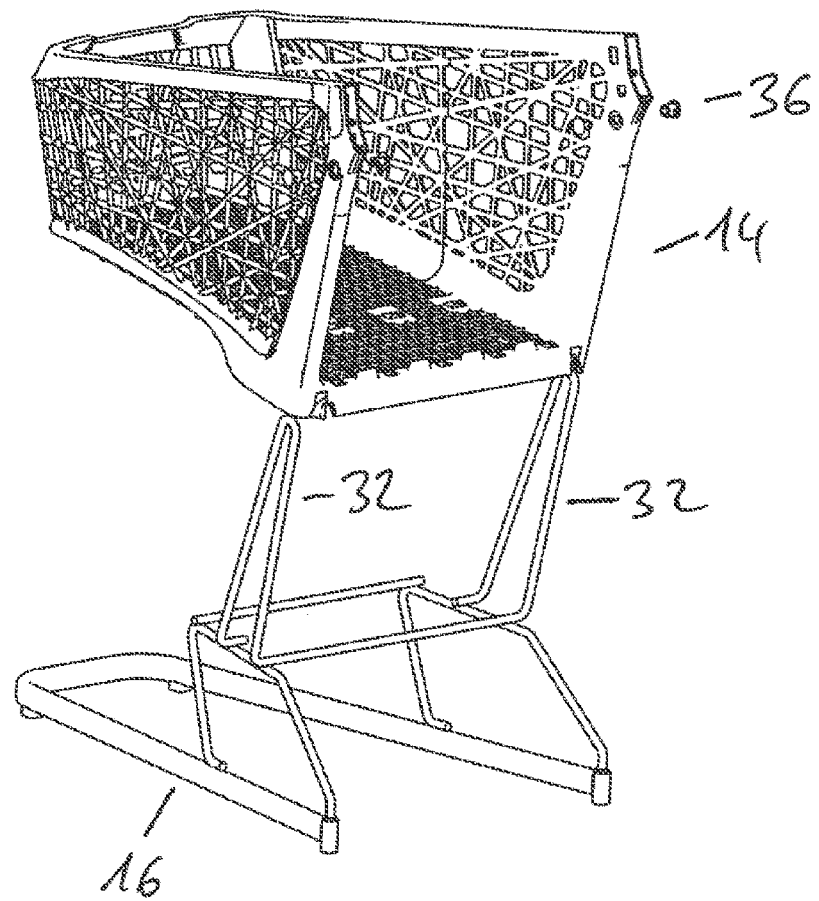
FIG. 6 shows a perspective exploded drawing of the chassis and basket of the transport trolley according to FIG. 1.
Figure 7:
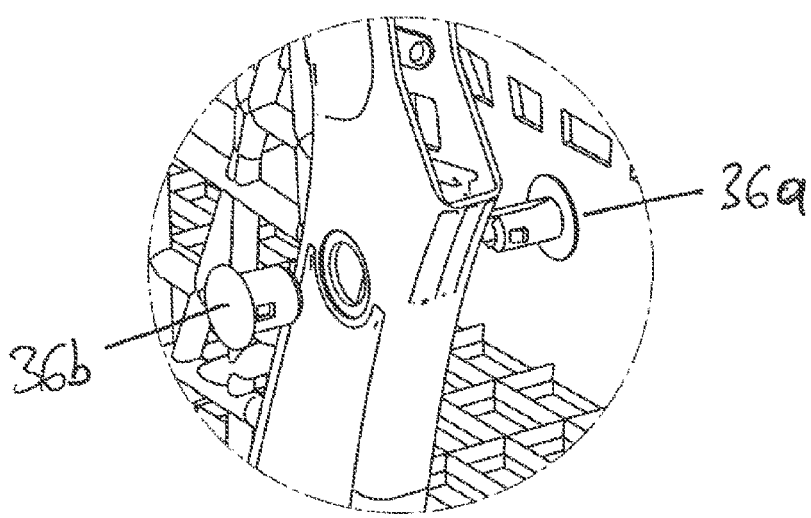
FIG. 7 shows a detailed illustration of the basket and of the locking clip.
Figure 8:
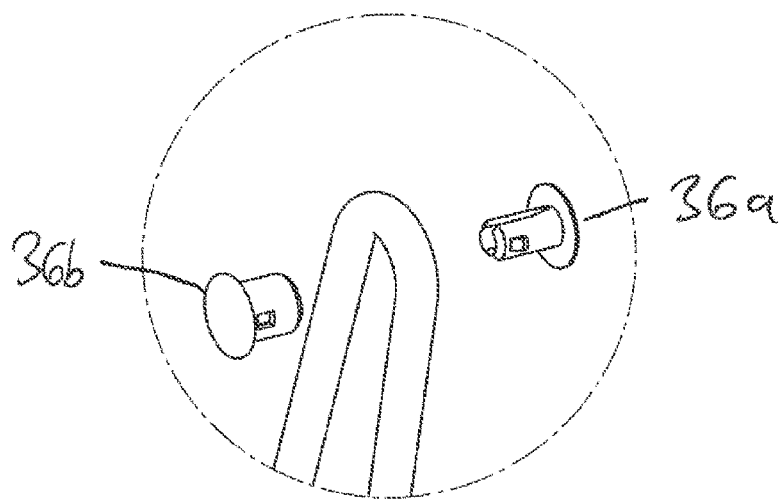
FIG. 8 shows a perspective top view of part of the wire framework and the locking clip according to FIG. 7.

As is furthermore shown in FIGS. 6, 7 and 8, the basket 14 is secured against being pulled off by means of a two-part locking clip 36 which consists of two halves 36a and 36b.

As is apparent in particular from FIG. 8, the locking clip 36 is inserted in such a manner that it is clipped in the tip of the V-shaped basket fastening bracket 32 such that it cannot be pulled off upward. As is furthermore apparent from FIG. 7, the locking clip 36 is inserted through a corresponding opening in the basket 14 and clipped there.

Figure 4:
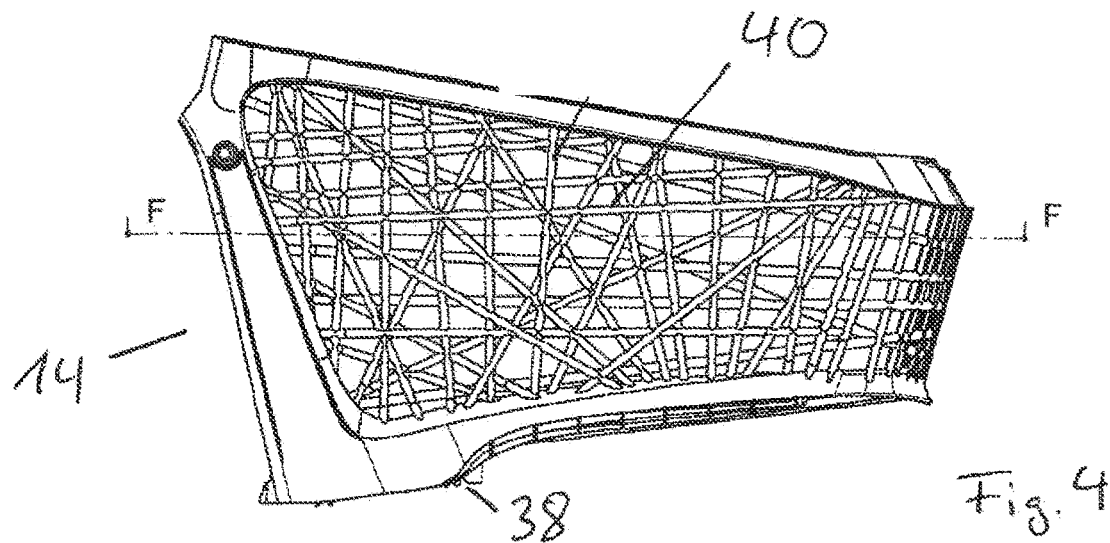
FIG. 4 shows a side view of the basket of the transport trolley according to FIG. 1.
Figure 5A:
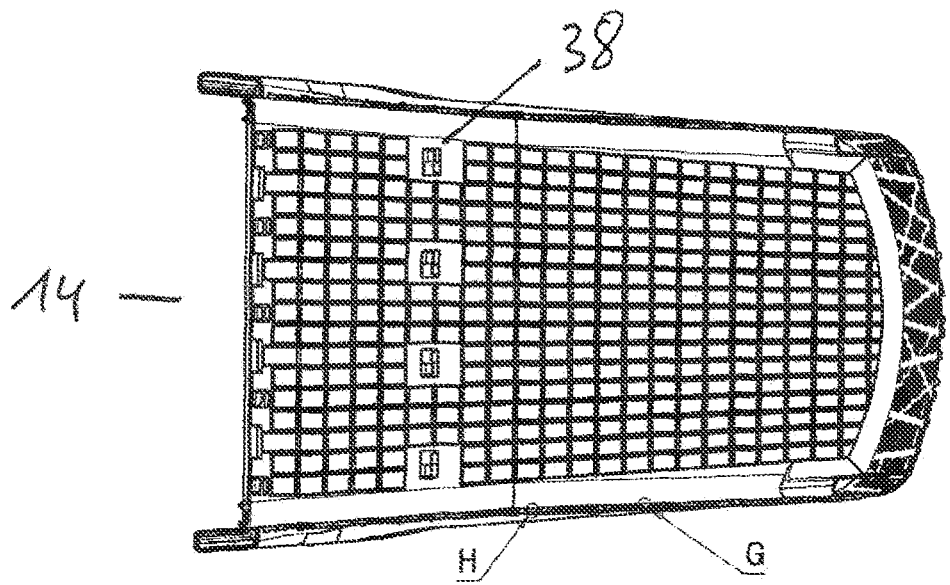
FIG. 5A shows a top view of the basket according to FIG. 4.
Figure 5B:
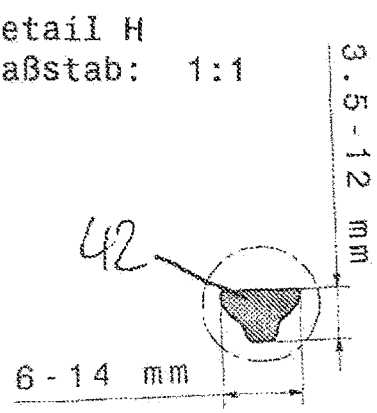
FIG. 5B shows detail G according to information in FIG. 5A.
Figure 5C:
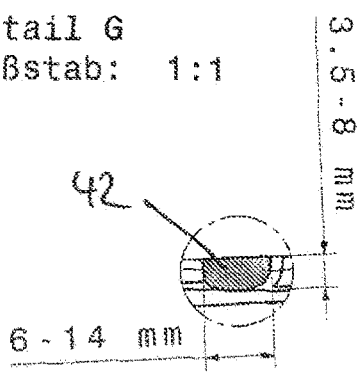
FIG. 5C shows detail H according to information in FIG. 5A.

As is furthermore apparent from FIGS. 4 and 5, the basket 14 in its bottom region has latching catches 38, by means of which the basket 14 is clipped on the wire framework 18.

The side walls of the basket 14 are formed by a nest structure 40, wherein the nest structure 40 is formed by a plurality of nest struts 42. The nest struts 42 for a side wall of the basket 14 are formed here in the region facing the ground in such a manner that they have a larger cross section there than in the region which faces the basket opening. This is apparent, for example, from FIG. 5A and from the details H and G according to FIG. 5B and FIG. 5C.

The basket 14 itself is designed as a plastic basket.

As is furthermore apparent from FIG. 1, in the assembled state, the basket 14 is connected to a pushing handle 44.

In a customary form, the pushing handle 44 has a coin deposit system 46, wherein the use of a coin deposit system 46 of this type is not compulsory, but rather is optional.

As is furthermore shown in FIGS. 9 to 11, for the connection of the pushing handle 44 to the basket 14, the pushing handle 44 is provided on both sides with two push-in blades 48, by means of which the pushing handle 44 can be inserted into the basket 14.

Figure 12:
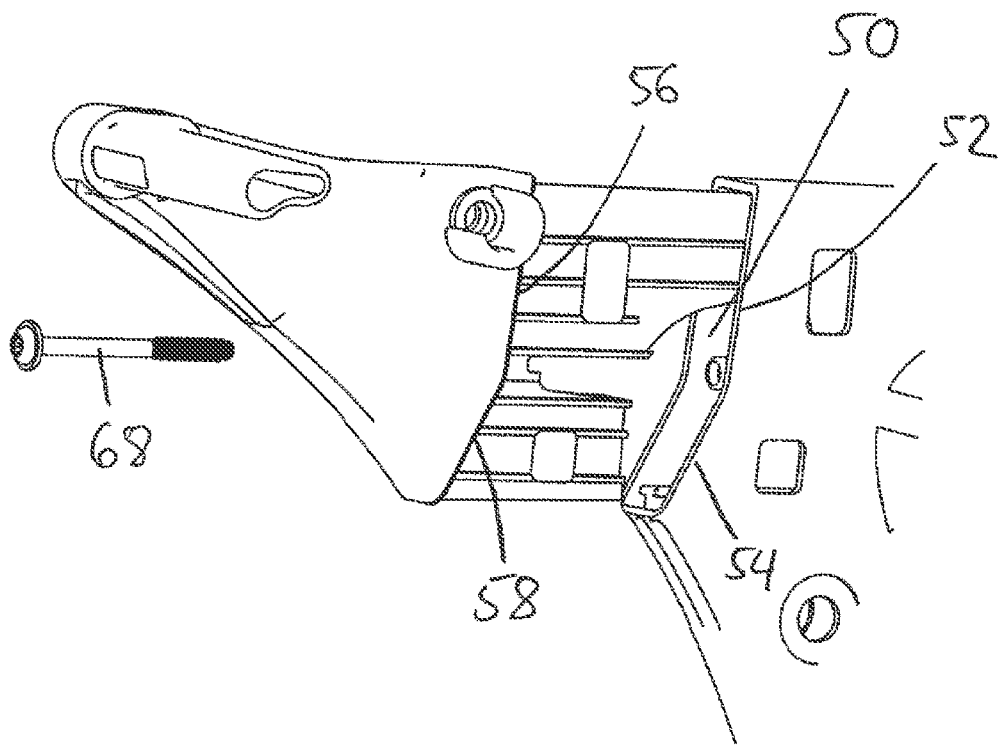
FIG. 12 shows a perspective view of the pushing handle and the push-in openings of the basket.

For this purpose, the basket 14, as is apparent from FIG. 12, has a push-in opening 50 on both sides.

The push-in opening 50 here has a double bevel, with a first bevel 52 and a second bevel 54.

The stops 56 and 58, which are of counter-part-like design, of the pushing handle 44 are positioned against the edge of said bevels 52 and 54 of the push-in opening 50 in the assembled state.

In the assembled state, the push-in blades 48 of the pushing handle 44 are inserted into the push-in openings 50 in a latching manner.

As is furthermore apparent from FIG. 10, the push-in blades 48 have a plurality of stiffening ribs 60 which rise vertically out of the plane of the push-in blade and structure the push-in blade 48 repeatedly in a T-shaped manner.

The push-in blade 48 is divided substantially centrally into an upper push-in blade half 62 and a lower push-in blade half 64.

As is apparent in particular from FIG. 10 and FIG. 12, a bolt receptacle 66 is provided between the two push-in blade halves 62 and 64, through which a fastening screw 68 can be screwed in in order to provide additional securing of the pushing handle 44 against being pulled off from the push-in opening 50 of the basket 14.

The bolt-like securing element 68, which is designed here as a screw bolt or screw, can also be another suitable type of bolt-like securing element 68.

As is furthermore apparent from FIG. 11, in the assembled state, an identification chip 70, here an RFID chip, can be arranged between the push-in blade 48 and a wall of the push-in blade opening 50.

Figure 13:
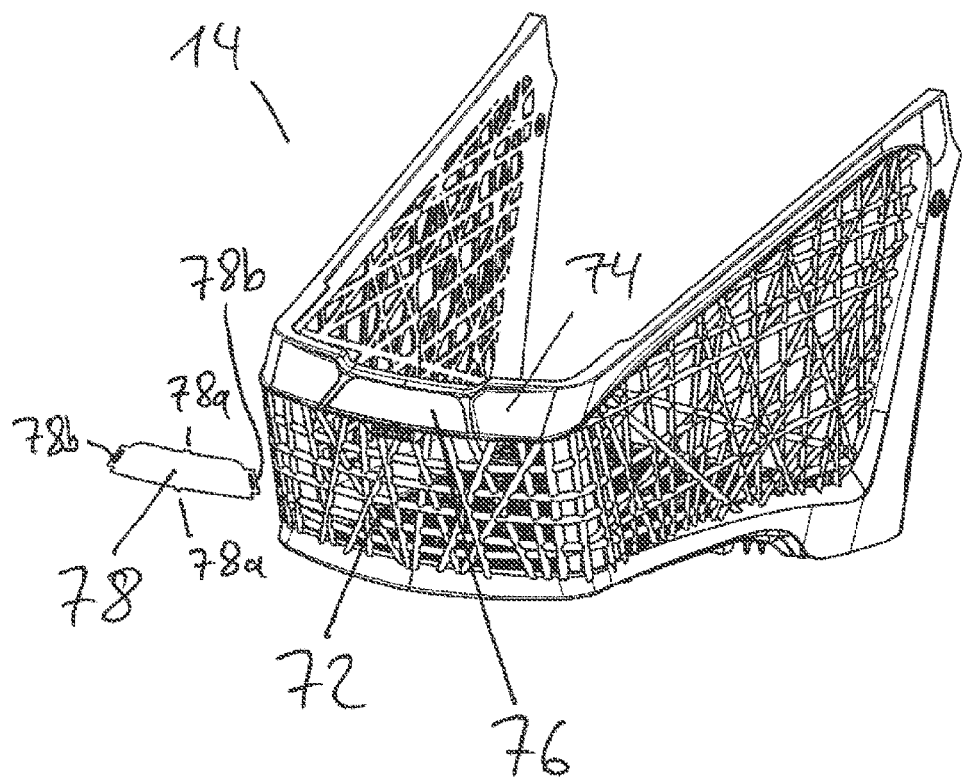
FIG. 13 shows a perspective front view of the basket.

As is furthermore apparent from FIG. 13, in the assembled state, the basket 14 has, on the front side, a nest-like front wall 72 which is formed from a plurality of nest struts 42.

Furthermore, an overlapping wall 74 which overlaps the upper edge of the front wall 72 is provided in the front region of the basket 14. The overlapping wall 74 projects into the interior of the basket 14 and therefore forms a type of impact reinforcement and retaining wall for products placed into the basket 14.

The overlapping wall 74 furthermore has an information field 76.

Figure 14:
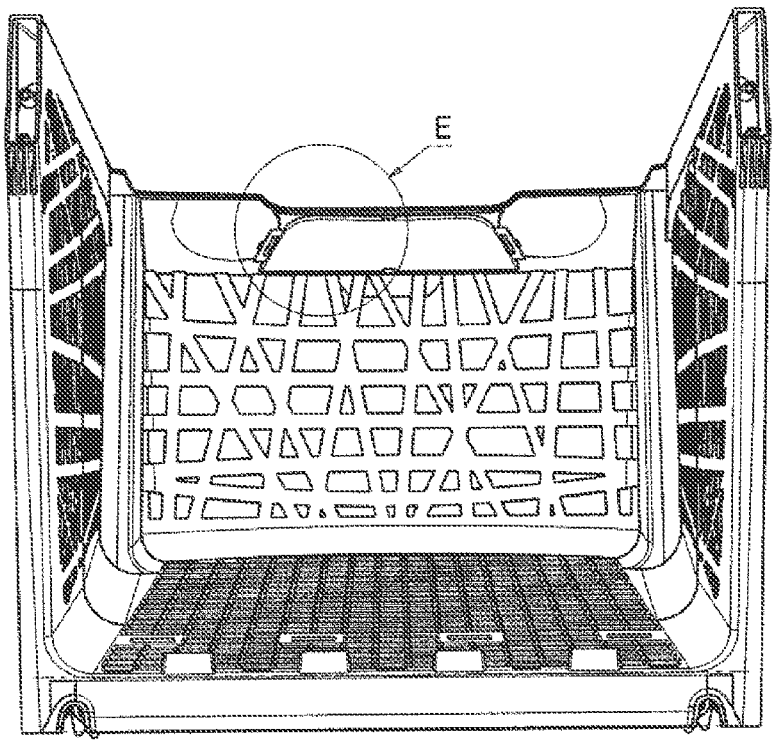
FIG. 14 shows a rear view of the basket.
Figure 15:
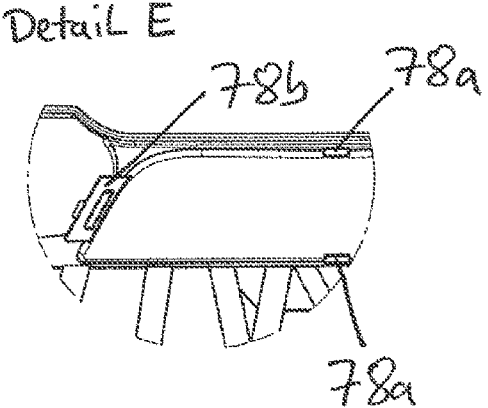
FIG. 15 shows detail E according to information in FIG. 14.

The information field 76 is in turn provided with a transparent covering 78 which can be clipped in in the edge region of the information field 76 (also see FIG. 14 and FIG. 15 which show the clipping-in tabs 78a and 78b of the transparent covering 78).

A corresponding clipping-in opening is in each case provided on the edge of the information field 76 for receiving the tabs 78a and 78b.

FIGS. 16 to 20 show a child seat 80 for the shopping trolley 10.

Figure 16:
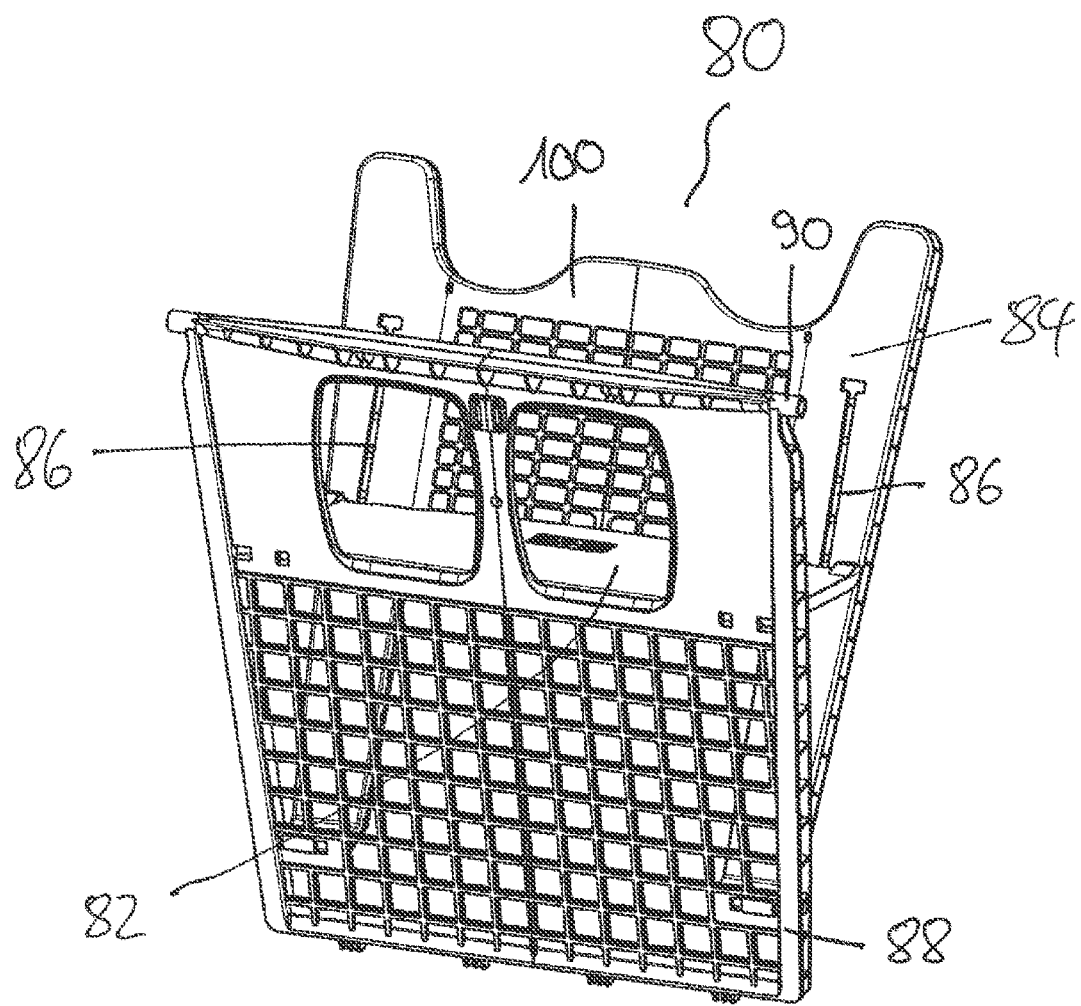
FIG. 16 shows a perspective view of the child seat of the transport trolley according to FIG. 1.
Figure 17:
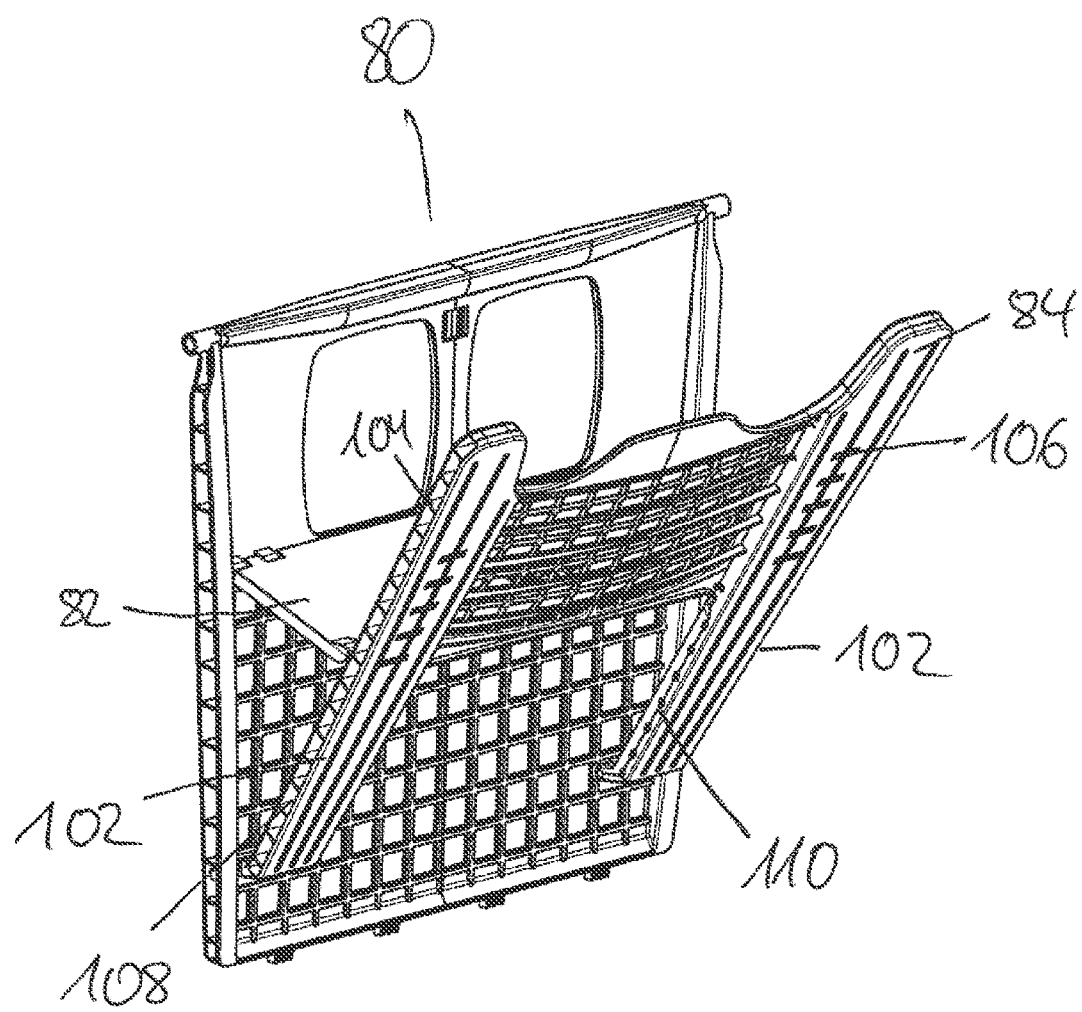
FIG. 17 shows a further perspective view of the child seat according to FIG. 16.

The child seat 80 which is illustrated in FIG. 16 for a shopping trolley 10, as illustrated in FIG. 1, is illustrated in the use position.

The child seat 80 has a seat board 82 and a backrest 84. The seat board 82 is connected to the backrest 84 in a sliding or pivotable manner and is guided here in two longitudinal sliding guides 86. The rear side of the basket 14 of the shopping trolley 10 is formed by the wall 88 which can pivot into the interior of the basket 14 about a horizontal axis 90 located at the top.

The backrest 84 is mounted with its lower boundary 92 or with downwardly leading supports 94 on the wall 88 so as to be pivotable to a limited extent thereon about a horizontal axis 96 which is located in the lower region of the wall 88.

Figure 19:
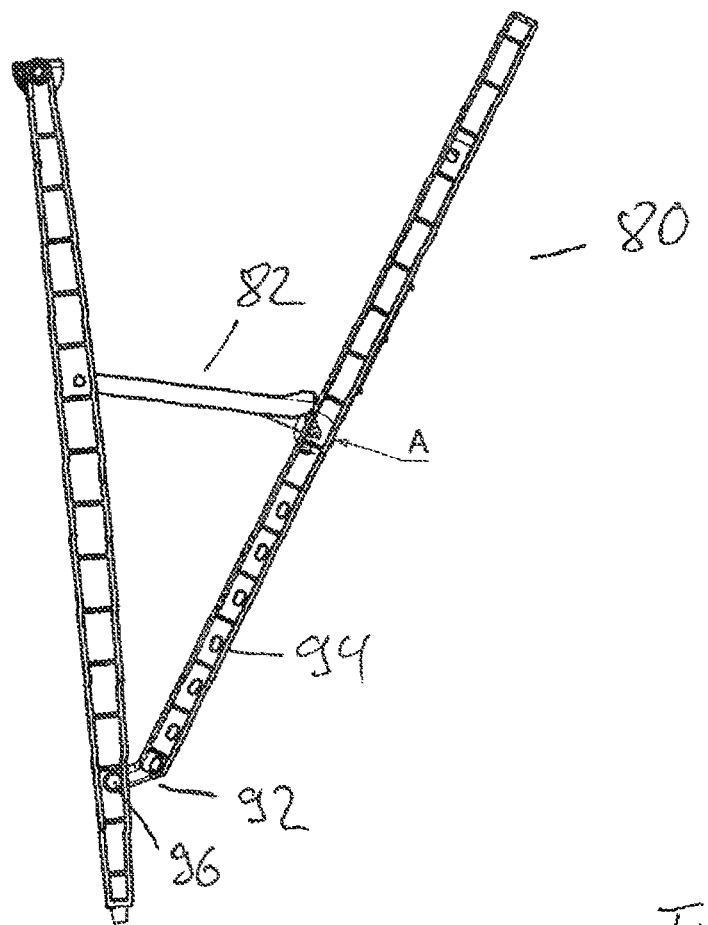
FIG. 19 shows a side view of the child seat according to FIG. 16.
Figure 20:
FIG. 20 shows detail A according to information in FIG. 19.

This is also shown in detail in FIG. 19.

The seat board 82 is mounted either in a pivotable or sliding manner on the wall 88.

This type of arrangement and construction is already known from the prior art, for example from EP 1 451 053 B1.

The backrest 84 can be pivoted onto the wall 88 while the wall 88 together with seat board 82 and backrest 84 can be pivoted about the horizontal axis 90 into the interior of the basket 14 for the purpose of pushing together a plurality of shopping trollies 10.

In the unfolded state of the backrest 84, the seat board 82 can be guided downward in the sliding guide 86 and latched there in a corresponding manner by means of a latching lug 98. This is shown in detail in FIGS. 19 and 20.

The backrest 84 is formed integrally and is substantially designed in the manner of a holding body.

Furthermore, the backrest 84 is of substantially H-shaped design, wherein the connection of the two limbs of the H shape is designed as a backrest wall 100.

The backrest 84 has side members 102 which are in the manner of hollow bodies and are provided with reinforcing struts in their interior. The reinforcing struts 104 are shown, for example, in FIG. 17 since the latter are apparent on the outer narrow sides of the side members 102, via which the structures in the manner of hollow bodies in the interior of the side members are accessible.

The cavities 106 are located between the reinforcing struts 104 which, in the assembled state, are accessible in the region of the backrest wall 100 via openings 108 which are provided on that side of the backrest 84 which faces the basket interior and which are designed in the manner of slots.

Between the reinforcing struts 104, cavities 106 are likewise provided in the region below the backrest wall 100, which cavities, in the assembled state, are accessible in the region below the backrest wall 100 via point-like openings 110 located on the side-member inner side.

Figure 18:
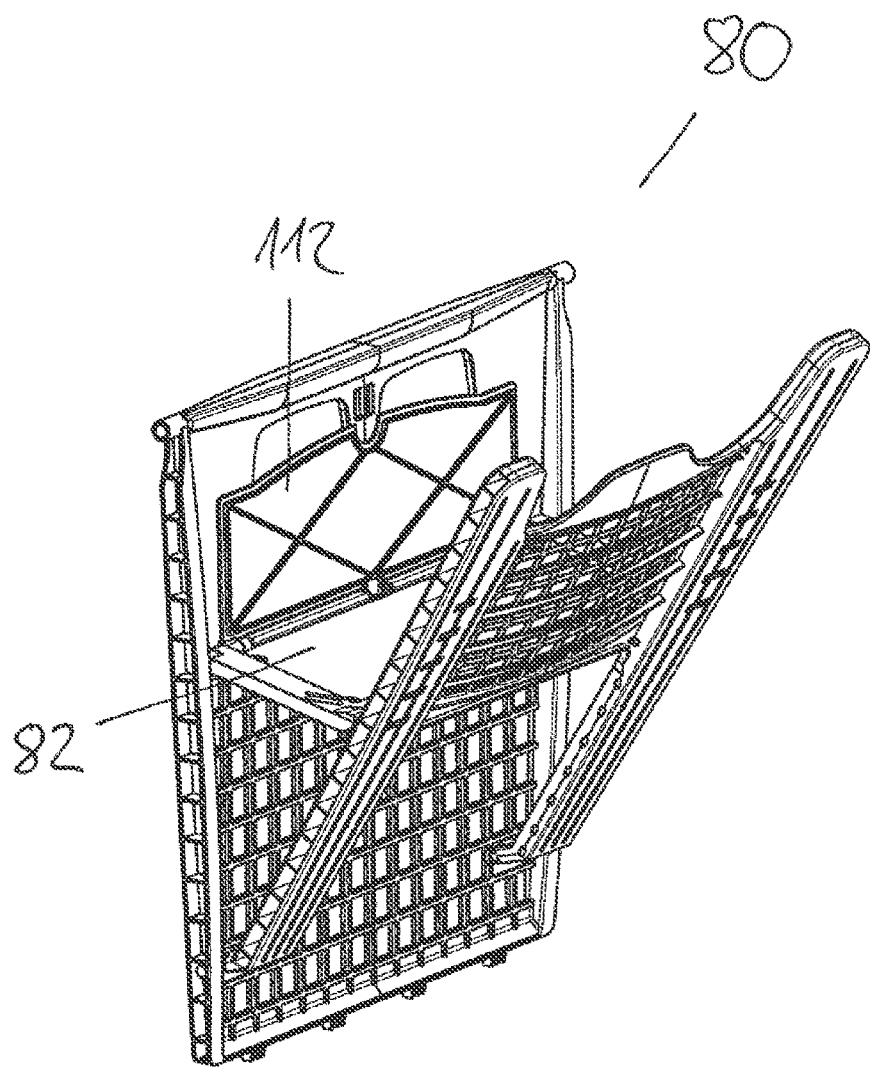
FIG. 18 shows a further perspective view of the child seat according to FIG. 16.

As is furthermore apparent from FIG. 18, the seat board 82 has a flap 112 which can be folded upwards against the wall 88.

It is thereby possible to use the child seat 80 as a location for depositing small products.

LIST OF REFERENCE SIGNS

10 Stackable transport trolley
12 Chassis
14 Basket
16 Supporting frame
18 Wire framework
20 Wheel
22 Wheel suspension
24 Wire bracket
24a, b, c Portion
26 Cross strut/cross bracing
28 Wire frame
30 Tube section
32 Basket fastening bracket
34 Cross strut
36 Locking clip
38 Latching catches
40 Nest structure
42 Nest struts
44 Pushing handle
46 Coin deposit system
48 Push-in blades
50 Push-in opening
52 First bevel
54 Second bevel
56 Stop
58 Stop
60 Stiffening ribs
62 Upper push-in blade half
64 Lower push-in blade half
66 Bolt receptacle
68 Fastening screw
70 Identification chip
72 Front wall
74 Overlapping wall
76 Information field
78 Transparent covering
78a Clipping-in tab
78b Clipping-in tab
80 Child seat
82 Seat board
84 Backrest
86 Longitudinal sliding guide
88 Wall
90 Horizontal axis
92 Lower boundary
94 Downwardly leading supports
96 Horizontal axis
98 Latching lug
100 Backrest wall
102 Side members in the manner of hollow bodies
104 Reinforcing struts
106 Cavities
108 Openings
110 Openings
112 Flap

The invention claimed is:

1. A child seat for a stackable transport trolley, comprising a backrest which is composed of plastic, arranged on the stackable transport trolley so as to be pivotable about a horizontal axis and to which at least one seat board is coupled in a sliding or pivotable manner, wherein the backrest is formed integrally, and wherein at least one subsection of the backrest is a hollow body, wherein the backrest has side members which are hollow bodies and are provided with reinforcing struts in an interior of the backrest;

wherein the backrest is H-shaped and a connection of two limbs of the H shape is a backrest wall; and wherein cavities are provided between the reinforcing struts, which cavities, in an assembled state of the stackable transport trolley, are accessible in a region of the backrest wall via openings provided on a side of the backrest facing a rear of the stackable transport trolley which forms a basket.

2. The child seat for the stackable transport trolley of claim 1, wherein the cavities are accessible in a region below the backrest via openings located on a side member inner side, wherein respective inner sides of each side member face each other.

3. The child seat for the stackable transport trolley of claim 1, wherein the backrest further comprises two longitudinal sliding guides.

4. The child seat for the stackable transport trolley of claim 1, wherein, in an unfolded state, the seat board is guided downward and latched to the backrest via a latching lug.

5. The child seat for the stackable transport trolley of claim 1, wherein the backrest is mounted with a lower boundary on a wall formed by a rear side of the basket of the stackable transport trolley.

6. The child seat for the stackable transport trolley of claim 5, wherein the horizontal axis about which the basket is pivotable is located in a lower region of the basket wall.

7. The child seat for the stackable transport trolley of claim 5, wherein the backrest is pivotable onto the basket wall.

8. The child seat for the stackable transport trolley of claim 7, wherein the basket wall together with the seat board and backrest are pivotable into the interior of the basket of the stackable transport trolley.

9. The child seat for the stackable transport trolley of claim 5, wherein the seat board has a flap which is configured to fold upwards against the basket wall.

10. The child seat for the stackable transport trolley of claim 1, wherein the openings are slots.

11. The child seat for the stackable transport trolley of claim 10, wherein the openings are horizontally adjacent the connection of the two limbs of the backrest.

12. The child seat for the stackable transport trolley of claim 1, wherein the cavities are accessible in a region below the backrest via the openings horizontally adjacent the connection of the two limbs of the backrest, and a second set of openings is located on a side member inner side, wherein respective inner sides of each side member face each other.

13. The child seat for the stackable transport trolley of claim 1, wherein the cavities are accessible in a region below the backrest via the openings horizontally adjacent the connection of the two limbs of the backrest, and a second set of openings is located on an outer edge of the side members of the backrest.

* * * * *